(12) United States Patent
Acharya et al.

(10) Patent No.: US 6,937,571 B1
(45) Date of Patent: Aug. 30, 2005

(54) METHOD OF TESTING A NETWORK DEVICE THROUGH A MEDIUM INDEPENDENT INTERFACE (MII)

(75) Inventors: Yatin R. Acharya, Sunnyvale, CA (US); Philip J. Keller, Fremont, CA (US); Matthew J. Fischer, Mountainview, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 939 days.

(21) Appl. No.: 09/597,370

(22) Filed: Jun. 19, 2000

(51) Int. Cl.$^7$ .............................................. H04J 3/14
(52) U.S. Cl. ...................................... 370/246; 370/463
(58) Field of Search ................................ 370/229, 230, 370/230.1, 231, 235, 236–236.2, 241, 241.1, 370/246, 247, 248–249, 254, 445, 216–228, 370/464, 469, 447, 362, 363, 365, 463

(56) References Cited

U.S. PATENT DOCUMENTS

| | | | |
|---|---|---|---|
| 5,361,261 A | 11/1994 | Edem et al. | |
| 5,465,364 A | 11/1995 | Lathrop et al. | |
| 5,548,731 A | 8/1996 | Chang et al. | |
| 5,606,559 A | 2/1997 | Badger et al. | |
| 5,784,573 A | 7/1998 | Szczepanek et al. | |
| 5,802,073 A * | 9/1998 | Platt ........................... | 714/733 |
| 5,892,768 A | 4/1999 | Jeng | |
| 5,940,401 A * | 8/1999 | Frazier et al. ............... | 370/445 |
| 5,963,595 A | 10/1999 | Graham et al. | |
| 5,974,051 A | 10/1999 | De Nicolo et al. | |
| 5,978,853 A | 11/1999 | Crayford et al. | |
| 5,995,514 A | 11/1999 | Lo | |
| 6,011,799 A | 1/2000 | Kerstein et al. | |
| 6,080,203 A * | 6/2000 | Njinda et al. .................. | 716/4 |
| 6,108,713 A * | 8/2000 | Sambamurthy et al. ..... | 709/250 |
| 6,108,726 A * | 8/2000 | Runaldue et al. ............. | 710/62 |
| 6,141,352 A * | 10/2000 | Gandy ......................... | 370/463 |
| 6,263,373 B1 * | 7/2001 | Cromer et al. .............. | 709/250 |
| 6,269,104 B1 * | 7/2001 | McLaughlin et al. ....... | 370/464 |
| 6,275,501 B1 * | 8/2001 | Lucas et al. ................. | 370/463 |
| 6,334,150 B1 * | 12/2001 | Cromer et al. .............. | 709/223 |
| 6,385,738 B1 * | 5/2002 | Lo ............................... | 714/25 |
| 6,459,705 B1 * | 10/2002 | Cheng ......................... | 370/463 |
| 6,529,961 B1 * | 3/2003 | Bray ........................... | 709/250 |

* cited by examiner

Primary Examiner—Dang Ton
Assistant Examiner—Phuc Tran
(74) Attorney, Agent, or Firm—Renner, Otto, Boisselle & Sklar, LLP

(57) ABSTRACT

A method of testing a network physical layer device (PHY) having a media independent interface (MII) includes sending information between the PHY and a tester along the data buses of the MII. The information may be sent in the form of special frames, the special frames being sent from the tester to the PHY including an identifier. The PHY includes means for detecting the identifier, for extracting control information from the special frames, and for using the control information to execute write operations to and read operations accessing the memory registers of the PHY, and for sending information to the tester. The information may be passed between the PHY at an exemplary rate of 100 Mb/sec.

36 Claims, 3 Drawing Sheets

| Pin | Input/Output |
|---|---|
| TXD0 | I |
| TXD1 | I |
| TXD2 | I |
| TXD3 | I |
| TX_EN | I |
| TX_ER | I |
| TX_CLK | O |
| MDIO | I/O |
| MDC | I |

| Pin | Input/Output |
|---|---|
| RXD0 | O |
| RXD1 | O |
| RXD2 | O |
| RXD3 | O |
| RX_DV | O |
| RX_ER | O |
| RX_CLK | O |
| COL | O |
| CRS | O |

METHOD OF TESTING A NETWORK DEVICE THROUGH A MEDIUM INDEPENDENT INTERFACE (MII)

BACKGROUND OF THE INVENTION

1. Technical Field of the Invention

The present invention generally relates to methods for testing network devices, and in particular to methods for faster testing of read and write processes involving memory registers of network devices.

2. Description of the Related Art

Network interfaces for connecting a device, such as a computer, to a network, commonly include a media access controller (MAC) and a physical layer device ("PHY" or "PHY device"). The MAC ensures that data being sent is properly formatted and addressed, so that the frames or packets are properly recognized by other devices on the network. Signals from the MAC are sent to the PHY, which handles the actual transmission of signals on the network medium. The network medium may be any of a variety of well known media, such as fiber-optic cables or various types of dedicated metal-wire cables such as twisted shielded pair, 10 BASE-T, and wiring for telephone lines. Alternatively, the network medium may include wireless communication.

It is desirable for the interface between the MAC and the PHY to be independent of the type of network media to which the PHY is attached. Media independence of the interface between the MAC and PHY allows use of identical MACs with various types of PHYs. Such a media independent interface (MII) is described in IEEE Standard 802.3u-1995, which is incorporated herein by reference in its entirety.

IEEE Standard 802.3u-1995 provides that read and write operations to memory registers of a PHY may be performed by sending management data frames to the PHY through the MII via a management data input/output (MDIO) pin of the device. The management data frames include an indication of whether a read or write operation is to be performed, the address of the memory register to be read from or written to, and (for write operations) the data to be written to the memory register.

During the manufacture of network components or devices, such as the PHY device described above, the components are tested at various stages. Manufacturers have significant economic incentive to detect and discard faulty components as early in the manufacturing process as possible.

Network components are generally produced in large quantities. To rapidly test large quantities of components, automatic test equipment (generally "testers") are used. The tester is electrically coupled to the inputs and outputs, such as the input and output pins, of a network component. The tester rapidly generates input signals for application to the integrated circuit of the network component, and can determine whether the appropriate response signals are generated. Because testers are highly automated, they can be programmed to run through a series of millions of test cases.

Testing of a PHY device involves the tester initiating numerous reads and writes to the memory registers of the PHY. Unfortunately, the management data frames for these test operations are serially passed through the MDIO pin at the relatively low rate of 2.5 Mb/sec, this rate being set by the management data clock rate of 2.5 MHz, which is specified in the IEEE 802.3u-1995 standard.

It would be desirable to increase the speed of testing of a PHY device which has a MII in accordance with the IEEE 802.3u-1995 standard.

SUMMARY OF THE INVENTION

A method of testing a network physical layer device (PHY) having a media independent interface (MII) includes sending information between the PHY and a tester along the data buses of the MII. The information may be sent in the form of special frames, the special frames being sent from the tester to the PHY including an identifier. The PHY includes means for detecting the identifier, for extracting control information from the special frames, and for using the control information to execute write operations and read operations accessing the memory registers of the PHY, and for sending information to the tester. The information may be passed between the PHY at an exemplary rate of 100 Mb/sec.

According to an aspect of the invention, a method of testing a network device includes passing information between a tester and the network device via a data bus of a MII.

According to another aspect of the invention, a method of testing a network device includes passing information between a tester and the network device via an MII, the passing involving passing the information across multiple pins of the MII. The passing the information may include simultaneously passing information across four or more pins of the MII.

According to yet another aspect of the invention, a method of testing a network device includes passing information between the tester and the network device at at least 10 Mb/sec.

According to still another aspect of the invention, a method of testing a network device includes sending information from a tester to the network device in special frames. The special frames may each include an identifier that allows the network device to distinguish them from data frames expected to be received in normal (non-testing) operation of the semi-conductor device.

According to a further aspect of the invention, a method of testing a network device includes sending information from the network device to a tester in the form of special frames.

According a still further aspect of the invention, a method of testing a network device includes sending control information from a tester to a network device in a frame, the control information including a series of register addresses and data to be written to memory registers corresponding to the register addresses.

According to another aspect of the invention, a method of testing a network device includes sending control information from a tester to the network device via a media independent interface at a data rate greater than 2.5 Mb/sec, and using the control information to write to and/or read from registers of the test device.

According to still another aspect of the invention, a method of testing a network device includes passing information between a test device and the network device via one or more data buses of a media independent interface, and using control information passed from the tester to the network device to perform operations in the network device.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

As described below, a method of testing a network physical layer device (PHY) having a media independent interface (MII) involves sending information between the PHY and a tester along nibble-wide MII transmit and receive data buses. Information may be sent in the form of special frames, the special frames being sent from the tester to the PHY including an identifier. The PHY includes means for detecting the identifier, for extracting control information from the special frames, and for using the control information to execute write operations to and read operations accessing the memory registers of the PHY, and for sending information to the tester.

Figure 1:
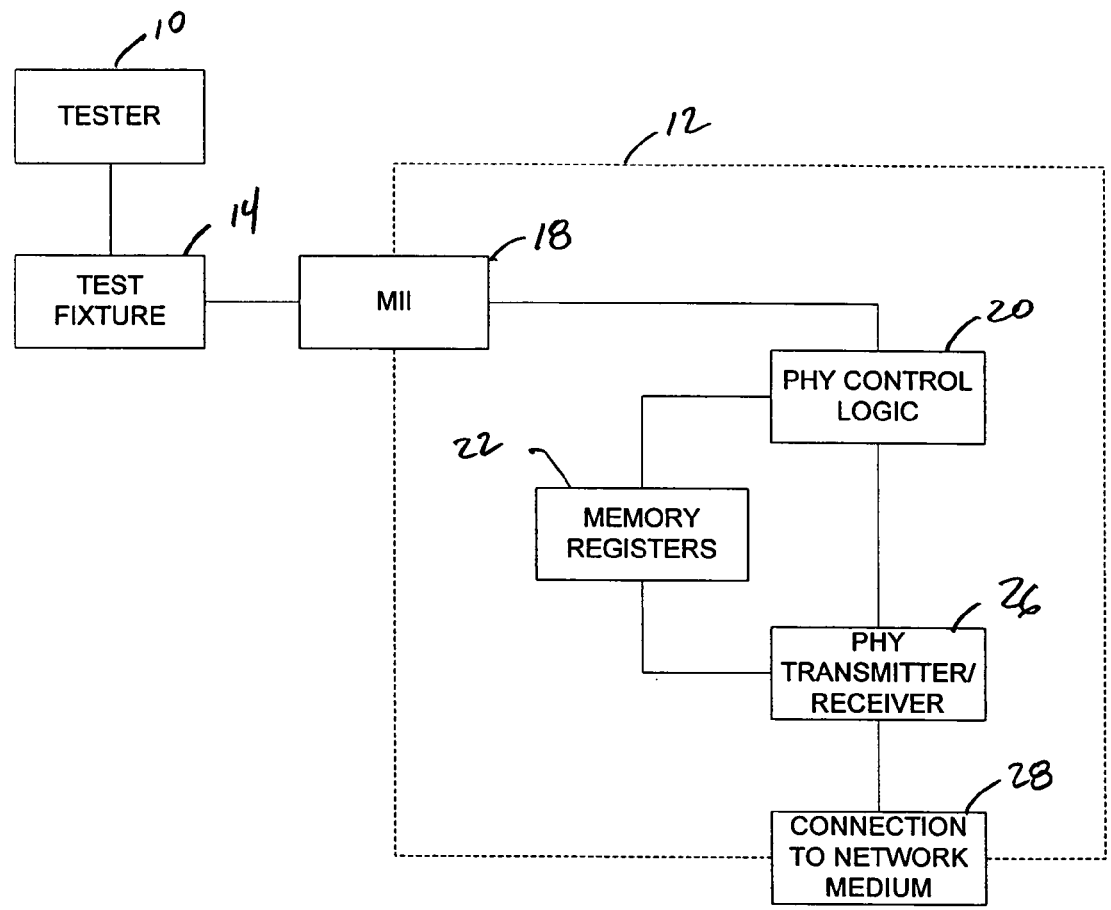
FIG. 1 is a block diagram of a tester coupled to a network device in accordance with the present invention.

Referring to FIG. 1, a block diagram shows a tester 10 for testing a network device 12 which is operatively coupled to the tester via a test fixture 14 such as a board or test head. The tester 10 may be of a conventional configuration, for example with means for sending and receiving data in order to test various aspects of the operation of the network device 12. The test fixture 14 may also be of a conventional configuration, for example with a device-under-test board (DUT board) which receives contacts such as pins of the network device 12, mechanical and/or pneumatic means for securing the network device to the test fixture, and means such as spring-loaded probes for electrically connecting the tester 10 to contact points on the DUT board which are electrically connected to the network device's pins. It will be appreciated that a variety of suitable testers and test fixtures are well known in the art.

For purposes of illustration, the test fixture 14 is shown as connected only to an MII 18 of the network device 12. As suggested above, the test fixture 14 may include means to receive all or most of the pins of the network device 12 and to provide electrical connection between the tester 10 and the pins of the network device, as is conventional.

The network device 12 includes, in addition to the MII 18, PHY control logic 20, memory registers 22 coupled to the PHY control logic, a PHY transmitter/receiver 26, and a connection 28 for connecting the device to a network medium. The PHY control logic 20 performs at least some of the functions described earlier: it examines incoming frames for the presence or absence of an identifier in order to determine if the incoming frames are special frames; it extracts control information from the special frames and performs reads or writes to the memory registers 22 of the network device 12; and it communicates information to the tester 10 via the MII 18 and the test interface 14.

The terms "media independent interface" and "MII" as used herein, are intended to include variations on the standard MII, such as the reduced media independent interface (RMII) and the serial media independent interface (SMII).

It will be appreciated that the PHY control logic 20 may have other functions related to the operation of the network device 12 when the device is connected to a network medium via the connection 28 and to a MAC via the MII 18. For example, the PHY control logic 20 and the memory registers 22 may be used to configure or to otherwise control operation of the PHY transmitter/receiver 26, to determine and/or to store information regarding the addresses and capabilities of other devices on the network, and/or to properly configure data destined for the MAC via the MII 18 or for the network via the connection 28.

It will be appreciated that the configuration of the network device 12 shown in FIG. 1 and described above is merely exemplary, and that the network interface may have a different configuration, including additional components, if desired.

Figures 2, 3:
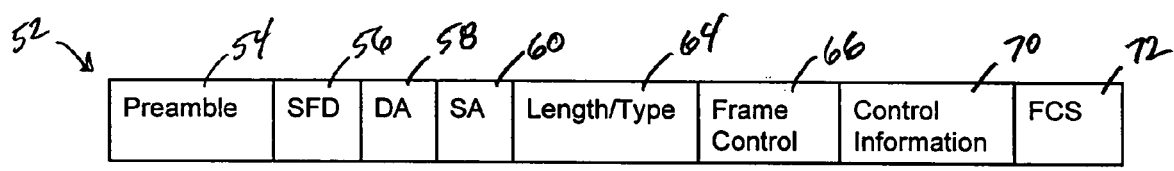
FIG. 2 is a block diagram detailing the media independent interface of the network device of FIG. 1.
FIG. 3 is diagram of an example of a format of a special frame used in testing the network device of FIG. 1.

Turning now to FIG. 2, further detail is given of the contacts (also referred to as "pins" or "lines") of the MII 18. The contacts are identified as in IEEE 802.3u-1995, and function is described therein. In this description the signals on the pins of the MII 18 are referred to as "input" or "output" with respect to the network device 12. The MII 18 includes four receive data lines RXD0–RXD3 which constitute the nibble-wide receive data bus for output of data received by the network device 12, for example from a network medium. Receive clock RX_CLK is a clock output that provides a timing reference for the transfer of the RXD0-RXD3, receive data valid RX_DV, and receive error RX_ER signals to the network device 12 via the MII 18. Per the IEEE 802.3u-1995 standard, a nibble rate clock signal is provided on RX_CLK which is 25% of the data transfer rate. Thus an MII operating at 10 Mbps (megabits per second) must provide a signal on RX_CLK of 2.5 MHz and an MII operating at 100 Mbps must provide a signal on RX_CLK of 25 MHz. (A total of four bits, one for each of RXD0–RXD3, are received for each clock cycle.) Receive data valid RX_DV is an output used to indicate that valid receive data is being presented on RXD0–RXD3 and that RX_CLK is synchronous to the received data. Receive error RX_ER is an input used to indicate a coding error in the data being received over RXD0–RXD3.

The MII 18 also includes four transmit pins TXD0–TXD3 which constitute a nibble-wide input data bus, for sending data to the network device 12 that is to be transmitted, for example along a network medium. Transmit clock TX_CLK is a clock signal output that provides a timing reference for the transfer of signals along TXD0–TXD3, transmit enable TX_EN, and transmit error TX_ER. Like RX_CLK, the signal on TX_CLK is 25% of the data transfer rate. Transmit enable TX_EN indicates when the network device is presenting valid transmit nibbles on the MII 18 via TXD0–TXD3. Transmit error TX_ER indicates that an error has been detected in the data currently being transmitted on TXD0–TXD3.

Management data input/output MDIO is a bidirectional management port data pin. A timing reference is provided for data transfer on MDIO by the management data clock MDC, which as indicated earlier runs at a nominal frequency of 2.5 MHz. Since only one bit of data is sent along the MDIO per MDC clock cycle, the maximum data transfer rate along the MDIO is 2.5 Mbps.

From the above it is apparent that data may be transferred much faster using RXD0–RXD3 or TXD0–TXD3 than using MDIO. The RXD0–RXD3 or TXD0–TXD3 have a data transfer rate (100 Mbps each) which is much greater than the nominal data transfer rate across the MDIO (2.5 Mbps). In addition, because of overhead the actual information passed via the MDIO is less than the nominal rate of 2.5 Mbps. For example, packets of the information passed to the network device 12 via the MDIO contain such items as a PHY address (which may be 5 bits long, for example) and a minimum spacing between packets, for example a minimum spacing of 2 bits. These items are unnecessary when passing information to the network device 12 using the RXD0—RXD3 or TXD0–TXD3. Thus the 100-Mbps data transfer rate along the RXD0–RXD3 or TXD0–TXD3 may be more properly compared with an effective information transfer rate of approximately 2 Mbps across the MDIO. Thus using the RXD0–RXD3 or TXD0–TXD3 may be effectively as much as 50 times or more faster than using the MDIO.

The special frames used to transmit control information to the network device 12 may have a format which bears some similarity to a standard Ethernet data frame format, and therefore may include certain "dummy" fields which are not used in the transfer of data between the tester 10 and the network device 12. Thus the special frames or packets may have fields which correspond to the fields in a data frame or packet, for example including information in fields corresponding to a destination address, a source address, a length and/or type of the frame, etc. The control information in the special frames or packets may be in the same position as data or payload is within a normal data frame or packet.

The control information in a special frame or packet sent from the tester 10 to the network device 12 may contain a series of register addresses and register contents, the control information being used to write to or read from (access) the memory registers 22. The control information may contain a portion which corresponds to a command to write to or read from certain of the memory registers 22. In addition, the control information may contain memory addresses to write to or to be read from, and data to write to specified memory registers. The control information in the special frames or packets may additionally or alternatively include various other kinds of information.

The special frames or packets may include identifiers which allow the PHY control logic 20 to detect the special frames. The identifier may be a unique address in the source and/or destination address fields of the special frame. Thus the identifier for the special frames may use an otherwise unused IEEE address as a source or destination address. Alternatively, the special frames may utilize the IEEE address of the network device 12 as a destination address. Another alternative identifier involves the special frame having a source address and a destination address which are the same. It will be appreciated that the PHY control logic 20 may be configured to detect the any or all of the foregoing identifiers.

Alternatively, the network device 12 may be put into a test mode during testing. In such a test mode the network device 12 may be configured to treat all frames incoming on the RXD0–RXD3 pins as special frames containing control data. The network device 12 may be placed into or taken out of the test mode by sending a signal to it from the tester 10. Such a signal may be sent via the RXD0–RXD3 pins of the MII 18, for example in a special frame having a unique identifier in the address fields or within the control information. Alternatively, such a signal may be sent via the MDIO pin of the MII 18.

It will be appreciated that frames similar to the special frames discussed herein may be used for control of or passing data from/to the network device 12. Identifiers for the special frames described above for use in testing a network device may be the same as or different than those for used for special frames employed in normal operation of the network device 12.

Referring now to FIG. 3, an exemplary format for a special frame or packet 52 is shown. The special frame 52 has a preamble 54 and a start-of-frame delimiter (SFD) block 56. The special frame 52 also has a destination address field 58 and a source address field 60. As noted above, identifiers may be placed in one or both of these fields to enable the special frame to be recognized and treated as a special frame at its desired destination.

The length-type field 64 and a frame control field 66, used in ordinary data frames to pass along information about the frame and/or instructions regarding it, may also be "dummy" fields. Alternatively, these fields (as well as other dummy fields) may include data or identifiers. A control information field 70 takes the place of the payload or data field in a ordinary Ethernet data frame. Finally, a cyclic redundancy check (CRC) field 72 or other type of FCS field may also be provided.

Figure 4:
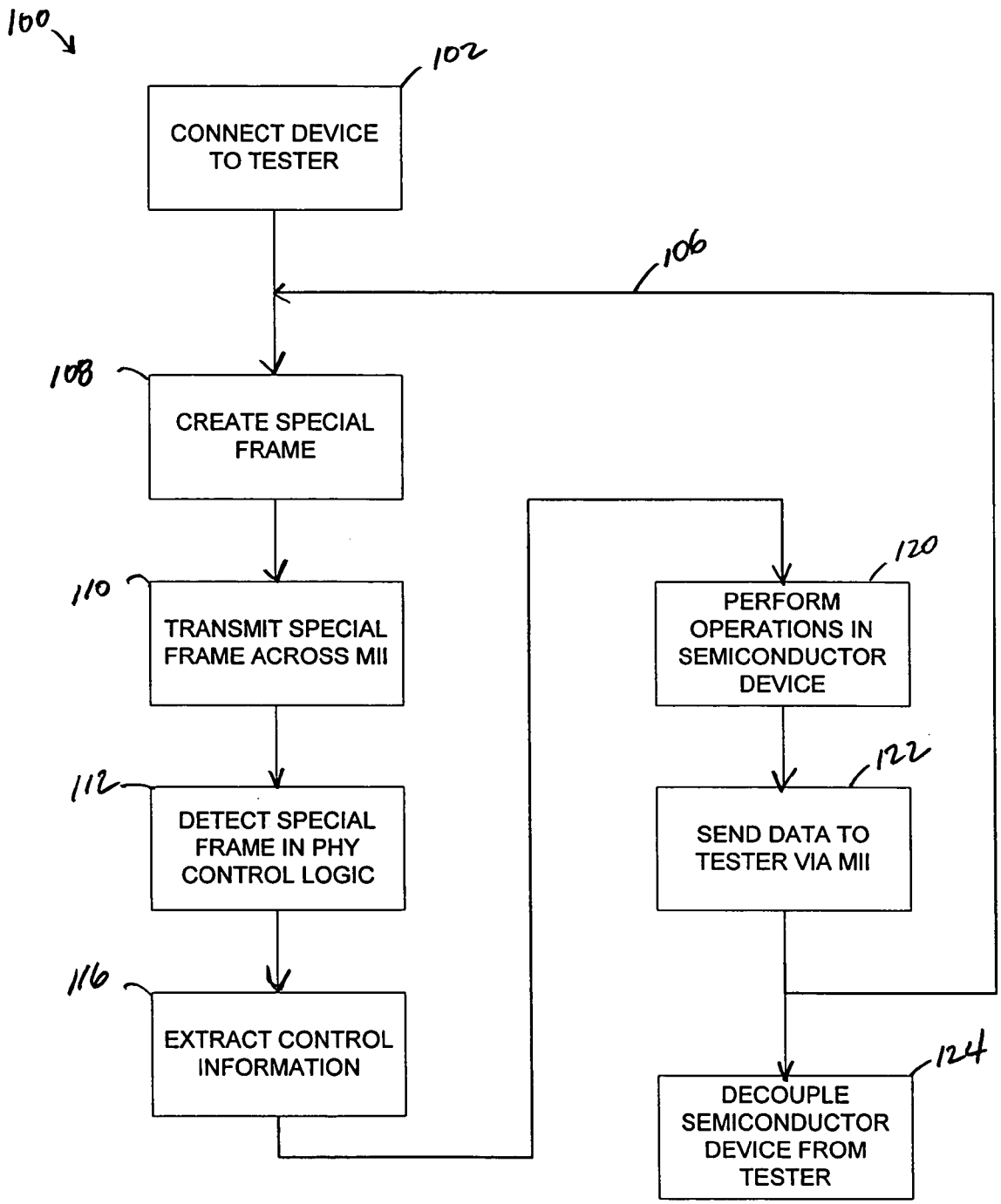
FIG. 4 is a flow chart illustrating the process for testing the network device of FIG. 1.

Turning now to FIG. 4, a block diagram shows the steps of a method 100 for utilizing special frames in testing the network device 12. In step 102 the network device is operatively coupled to the tester 10 via the test interface 14. Thereafter the testing is commenced and a series or read/write operations 106 are performed to test the ability of the network device 12 to accurately perform reads and writes to the memory registers 22. A special frame is created, for example in the tester 10, in step 108. In step 110 the special frame is transferred from the tester 10 to the network device via the transmit data pins TXD0–TXD3 of the MII 18. The transfer takes place at a data rate of 10 Mbps or 100 Mbps.

The identifier of the special frame is detected by the PHY control logic 20 in step 112. The PHY control logic 20 then extracts the control information from the special frame in step 116, and the control information is used to perform writes to or reads from the memory registers 22, as desired, in step 120.

In step 122, data may be sent from the network device 12 to the tester 10. The data may include, for example, the contents of the memory registers 22 which were read as instructed by the control information of the special frames. The data sent in step 122 may be sent along the receive data pins RXD0–RXD3. The data may be sent at the same rate or at a different rate than the data was received in step 110. The data may be sent in a frame format similar to the format of the special frames received in step 110. The data sent to the tester 10 may be processed and/or may be stored for later processing, either in the tester 10 or in another device. The data in processed and/or unprocessed form being used in evaluating the performance of the network device 12.

With regard to steps 110 and 122, it will be appreciated that it may be possible to utilize the MDIO as an alternative and/or additional route of transferring information between the tester 10 and the network device 12.

When all of the desired read/write testing cycles 106 have been accomplished, and all other desired testing of the network device 12 by the tester has been accomplished, the network device is decoupled from the tester in step 124 and removed from the test fixture 14.

It will be appreciated that the above description is only exemplary, and that many variations of the above-described apparatus and method may be employed. For example, an MII such as an RMII or an SMII may have a data stream using nibbles greater than or less than four bits wide, for example two bits wide or one bit wide. Alternatively or in addition, the rate of data transmission across MII may be at a different rate which is greater than 2 Mbps.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of testing a physical layer network device, the method comprising:
    sending control information from a tester to the physical layer network device via a media independent interface (MII) at a data rate greater than 2.5 Mb/sec; and
    using the control information to write to and/or read from registers of the tester;
    wherein the sending the control information includes sending the information via at least four pins of a data bus.

2. The method of claim 1, wherein the sending the control information includes sending the control information at at least 10 Mb/sec.

3. The method of claim 1, wherein the sending the control information includes sending the control information at at least 100 Mb/sec.

4. The method of claim 1, wherein the sending information includes sending the control information via a data bus of the MII.

5. The method of claim 4, wherein the sending the information via the data bus includes sending the information in frames.

6. The method of claim 5, wherein the frames each include a preamble, a start frame delimiter, the control information, and an end frame delimiter.

7. The method of claim 5, wherein the frames include an identifier, and wherein the using the information includes identifies identifying the frames in the network device.

8. The method of claim 5, wherein the using the information includes extracting the control information from the frames in the network device.

9. The method of claim 1, wherein the control information includes information in the form of register addresses and register contents.

10. A method of testing a physical layer network device, the method comprising:
    sending control information from a tester to the physical layer network device via a media independent interface (MII) at a data rate greater than 2.5 Mb/sec; and
    using the control information to write to and/or read from registers of the tester;
    wherein the sending the control information includes sending the information in nibbles of at least four bits.

11. The method of claim 10, wherein the sending the control information includes sending the control information at at least 10 Mb/sec.

12. The method of claim 10, wherein the sending the control information includes sending the control information at at least 100 Mb/sec.

13. The method of claim 10, wherein the sending information includes sending the control information via a data bus of the MII.

14. The method of claim 13, wherein the sending the information via the data bus includes sending the information in frames.

15. The method of claim 14, wherein the frames each include a preamble, a start frame delimiter, the control information, and an end frame delimiter.

16. The method of claim 14, wherein the frames include an identifier, and wherein the using the information includes identifies identifying the frames in the network device.

17. The method of claim 14, wherein the using the information includes extracting the control information from the frames in the network device.

18. The method of claim 10, wherein the control information includes information in the form of register addresses and register contents.

19. A method of testing a physical layer network device, the method comprising:
    passing information between a tester and the physical layer network device via one or more data buses of a media independent interface (MII), wherein the information includes control information passed from the tester to the network device; and
    using the control information to perform operations in the network device;
    wherein the passing the information includes passing information along at least four pins of the MII.

20. The method of claim 19, wherein the operations include writing to and reading from memory registers of the network device.

21. The method of claim 19, further comprising evaluating the network device using the information from the network device passed to the tester.

22. The method of claim 19, wherein the passing the information includes passing the information at a rate of greater than 2.5 Mb/sec.

23. The method of claim 19, wherein the sending information includes sending the information at at least 10 Mb/sec.

24. The method of claim 19, wherein the sending information includes sending the information at at least 100 Mb/sec.

25. A method of testing a physical layer network device, the method comprising:
    passing information between a tester and the physical layer network device via one or more data buses of a media independent interface (MII), wherein the information includes control information passed from the tester to the network device; and
    using the control information to perform operations in the network device;

wherein the passing the information includes passing the information in nibbles of at least four bits.

26. The method of claim 25, wherein the operations include writing to and reading from memory registers of the network device.

27. The method of claim 25, further comprising evaluating the network device using the information from the network device passed to the tester.

28. The method of claim 25, wherein the passing the information includes passing the information at a rate of greater than 2.5 Mb/sec.

29. The method of claim 25, wherein the sending information includes sending the information at at least 10 Mb/sec.

30. The method of claim 25, wherein the sending information includes sending the information at at least 100 Mb/sec.

31. A method of testing a physical layer network device, the method comprising:

passing information between a tester and the physical layer network device via one or more data buses of a media independent interface (MII), wherein the information includes control information passed from the tester to the network device;

using the control information to perform operations in the network device; and placing the network device in a test mode prior to passing the control information to the network device.

32. The method of claim 31, wherein the operations include writing to and reading from memory registers of the network device.

33. The method of claim 31, further comprising evaluating the network device using the information from the network device passed to the tester.

34. The method of claim 31, wherein the passing the information includes passing the information at a rate of greater than 2.5 Mb/sec.

35. The method of claim 31, wherein the sending information includes sending the information at at least 10 Mb/sec.

36. The method of claim 31, wherein the sending information includes sending the information at at least 100 Mb/sec.

* * * * *